United States Patent
Tsubaki et al.

(10) Patent No.: US 11,196,659 B2
(45) Date of Patent: Dec. 7, 2021

(54) ROUTE CALCULATION METHOD, ROUTE CALCULATION APPARATUS AND PROGRAM

(71) Applicant: Nippon Telegraph and Telephone Corporation, Tokyo (JP)

(72) Inventors: Takuma Tsubaki, Tokyo (JP); Mika Ishizuka, Tokyo (JP); Hiroshi Inoue, Tokyo (JP); Seisho Yasukawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/969,234

(22) PCT Filed: Feb. 13, 2019

(86) PCT No.: PCT/JP2019/005117
§ 371 (c)(1),
(2) Date: Aug. 12, 2020

(87) PCT Pub. No.: WO2019/159971
PCT Pub. Date: Aug. 22, 2019

(65) Prior Publication Data
US 2021/0006486 A1    Jan. 7, 2021

(30) Foreign Application Priority Data
Feb. 16, 2018 (JP) ............................. JP2018-026457

(51) Int. Cl.
*H04L 12/24* (2006.01)
*H04L 12/759* (2013.01)
(Continued)

(52) U.S. Cl.
CPC ........ *H04L 45/028* (2013.01); *H04L 41/0618* (2013.01); *H04L 45/70* (2013.01); *H04W 4/90* (2018.02)

(58) Field of Classification Search
CPC ..... H04L 41/00; H04L 41/06; H04L 41/0604; H04L 41/0631; H04L 41/064;
(Continued)

(56) References Cited

U.S. PATENT DOCUMENTS 8,768,623 B2 *  7/2014  Krzanowski ....... G01C 21/3492
                                                    701/533
9,257,033 B2 *  2/2016  Childers ................ G08B 25/10
(Continued)

OTHER PUBLICATIONS

Tsubaki et al., "Evaluation method of seismic effect of communication channel between buildings considering effect of facility reinforcement," 2016 IEICE Communications Society Conference, Sep. 20, 2016, p. 94, 4 pages (with English Translation).
(Continued)

*Primary Examiner* — Boris D Grijalva Lobos
(74) *Attorney, Agent, or Firm* — Fish & Richardson P.C.

(57) ABSTRACT

A computer executes a first determination procedure determining a first link which at least partially overlaps a disaster area representing a range reached by an influence of a predetermined disaster, among links constituting a network, a second determination procedure determining a second link which at least partially overlaps a road area representing a range of a road width of a predetermined road used to recover from the disaster, among the links constituting the network, a route search procedure searching for a plurality of routes from a start point node to an end point node constituting the network, a grouping procedure grouping the plurality of routes searched for by the route search procedure into groups depending on a first parameter value that is based on the first link included in the routes, a computing (Continued)

procedure computing, for each of the plurality of routes searched for by the route search procedure, a second parameter value that is based on the first link and the second link included in the routes, and a selecting procedure selecting a predetermined number of routes among one or more routes grouped into the same group on the basis of the second parameter value computed by the computing procedure for each of the groups grouped by the grouping procedure.

15 Claims, 14 Drawing Sheets

(51) Int. Cl.
 *H04L 12/721* (2013.01)
 *H04W 4/90* (2018.01)
(58) Field of Classification Search
 CPC ... H04L 41/065; H04L 41/0654; H04L 45/00; H04L 45/02; H04L 45/028; H04L 45/14; H04L 45/22; H04L 45/28; H04L 45/70; H04L 4/00; H04L 4/90
 See application file for complete search history.

(56) References Cited

U.S. PATENT DOCUMENTS

| | | | |
|---|---|---|---|
| 9,363,656 B1* | 6/2016 | George | H04W 4/90 |
| 2005/0034075 A1* | 2/2005 | Riegelman | G08B 25/016 715/714 |
| 2009/0319180 A1* | 12/2009 | Robinson | H04W 4/029 701/532 |

OTHER PUBLICATIONS

Tsubaki et al., "Investigation of Route Calculation Algorithm for Relay Cable Design in Communication Networks," Information of Electronics, Information and Communication Engineers, 2017, 117(159):1-6, 15 pages (with English Translation).

* cited by examiner

Fig. 7
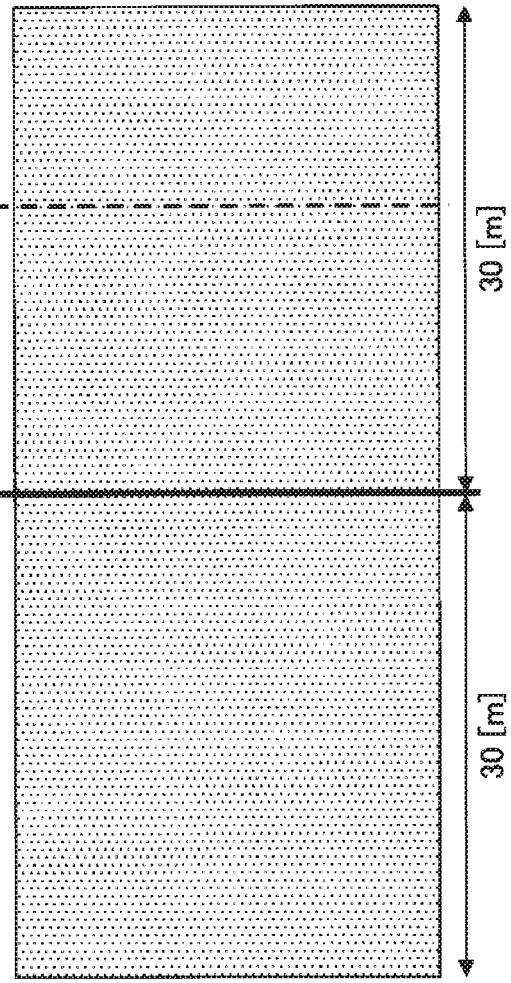
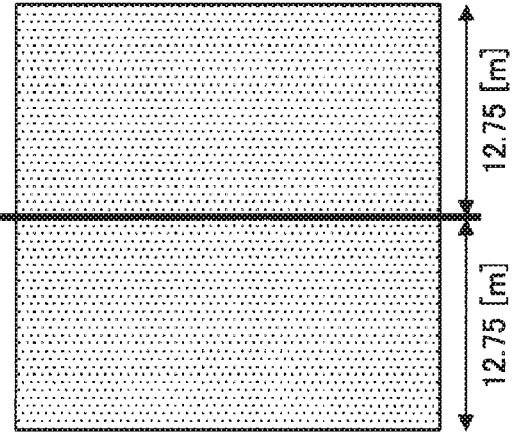

Fig. 14

|  |  | DIFFICULTY TO BE AFFECTED BY DISASTERS | | EASINESS TO RECOVER FROM DISASTER |
|---|---|---|---|---|
|  |  | LENGTH OF LINK IN TSUNAMI AREA [m] | LENGTH OF LINK IN LIQUEFACTION AREA [m] | LENGTH OF LINK DIFFICULT TO RECOVER FROM DISASTERS [m] |
| GROUP 1 | ROUTE 1 | $a_1$ | $b_1$ | $c_1$ |
| | ROUTE 2 | $a_2$ | $b_2$ | $c_2$ |
| GROUP 2 | ROUTE 3 | $a_3$ | $b_3$ | $c_3$ |
| | ROUTE 4 | $a_4$ | $b_4$ | $c_4$ |

ROUTE CALCULATION METHOD, ROUTE CALCULATION APPARATUS AND PROGRAM

CROSS-REFERENCE TO RELATED APPLICATIONS

This application is a National Stage application under 35 U.S.C. § 371 of International Application No. PCT/JP2019/005117, having an International Filing Date of Feb. 13, 2019, which claims priority to Japanese Application Serial No. 2018-026457, filed on Feb. 16, 2018. The disclosure of the prior application is considered part of the disclosure of this application, and is incorporated in its entirety into this application.

TECHNICAL FIELD

The present invention relates to a route calculation method, a route calculation apparatus, and a program.

BACKGROUND ART

In recent years, an algorithm is under study to calculate, as a possible communication route for use in disaster, a plurality of disaster-proof routes which are geographically dispersed among an enormous number of routes (for example, all combinations of conduits, or the like). For example, a technique has been known for calculating a plurality of routes having low disaster-affected rates (that is, a plurality of disaster-proof routes) among an enormous number of routes (Non-Patent Literature 1).

Additionally, a known technique for evaluating a reliability of a possible communication route for use in disaster includes a technique to evaluate a reliability of a communication route on the basis of a disaster-affected rate, which are attributes of facilities (for example conduits or the like), a length of a conduit to be affected by a disaster, or the like, (Non-Patent Literature 2).

Citation List

Non Patent Literature

Non-Patent Literature 1: Takuma Tubaki, et al. "An algorithm for route design in communication network (Communication Quality)." IEICE technical report: 117.159 (2017): 25-30.

Non-Patent Literature 2: Takuma Tubaki, et al. "B-7-4 Study on a technique for seismic effect evaluation on a communication channel between buildings in consideration of effect of reinforcing facilities."
Proceedings of the 2016 IEICE Society Conference, 2016.9.

SUMMARY OF INVENTION

Technical Problem

Here, an academic field called reliability engineering has been known. In the reliability engineering, reliability of a system is evaluated in accordance with two parameters, failure-proofness and easiness to repair upon failed. For example, as for reliability of a system on the presumption of random failure, parameters are provided as attributes of facilities: a failure rate (parameter representing failure-proofness) and a time to failure (parameter representing easiness to repair), and an availability rate or an unavailability rate of a facility is calculated on the basis of these parameters, and reliability of this facility is evaluated.

For this reason, also in a case of calculating the communication route on the presumption of disaster, it is preferable to calculate a route in consideration of two parameters: disaster-proofness (parameter corresponding to failure-proofness in the reliability engineering) and easiness of recovery from disaster in a case of being affected by disasters (parameter corresponding to easiness to repair in the reliability engineering).

However, in the related art, in calculating the possible communication route for use in disaster, the easiness of recovery from disaster is not taken into consideration. This is because, for example, a time to failure of a facility in a time of disaster (that is, the easiness of recovery from disaster) is difficult to estimate in advance, or is difficult to calculate from historical data. Additionally, this is because, for example, a transfer time taken from a location of a fallback facility to a disaster-affected site can be estimated by applying the technique for evaluating the reliability of a system on the presumption of random failure, but working hours for recovery in the disaster-affected site are difficult to estimate.

The present invention has been made in consideration of the above circumstance, and has an object to calculate a communication route in consideration of disaster-proofness and easiness of recovery from disaster.

Solution to Problem

In order to solve the above disadvantages, according to an embodiment of the present invention, a computer executes a first determination procedure determining a first link which at least partially overlaps a disaster area representing a range reached by an influence of a predetermined disaster, among links constituting a network, a second determination procedure determining a second link which at least partially overlaps a road area representing a range of a road width of a predetermined road used to recover from the disaster, among the links constituting the network, a route search procedure searching for a plurality of routes from a start point node to an end point node constituting the network, a grouping procedure grouping the plurality of routes searched for by the route search procedure into groups depending on a first parameter value that is based on the first link included in the routes, a computing procedure computing, for each of the plurality of routes searched for by the route search procedure, a second parameter value that is based on the first link and the second link included in the routes, and a selecting procedure selecting a predetermined number of routes among one or more routes grouped into the same group on the basis of the second parameter value computed by the computing procedure for each of the groups grouped by the grouping procedure.

Advantageous Effects of Invention

It is possible to calculate a communication route in consideration of disaster-proofness and easiness of recovery from disaster.

BRIEF DESCRIPTION OF DRAWINGS

FIG. 7 is an explanatory diagram illustrating an example of the data tailoring in a case where location information of a link has an error.

FIG. 14 is a diagram illustrating an example of disaster-proofness and easiness of recovery from disaster.

DESCRIPTION OF EMBODIMENTS

Hereinafter, a description is given of an embodiment of the present invention in detail with reference to the drawings. In an embodiment of the present invention, a description is given of a route calculation apparatus 10 that calculates a plurality of routes in consideration of two of both disaster-proofness and easiness of recovery from disaster in an electrical communication network or a communication net (hereinafter, also simply referred to as a "network") including nodes and links. Note that, a node in a network refers to, for example, a housing station building, a router, a manhole, a power pole, or the like. Additionally, a link in a network refers to a communication cable, a service tunnel, a utility corridor, a conduit, or the like. A link is also referred to as a "facility".

Configuration of Route Calculation Apparatus 10

Figure 1:
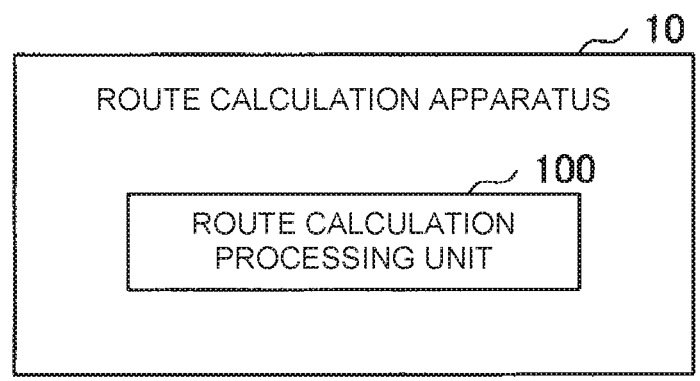
FIG. 1 is a diagram illustrating an example of a configuration of a route calculation apparatus according to an embodiment of the present invention.

First, a configuration of a route calculation apparatus 10 according to an embodiment of the present invention is described with reference to FIG. 1. FIG. 1 is a diagram illustrating an example of the configuration of the route calculation apparatus 10 according to an embodiment of the present invention.

As illustrated in FIG. 1, the route calculation apparatus 10 according to an embodiment of the present invention includes a route calculation processing unit 100. The route calculation apparatus 10 calculates a plurality of routes in consideration of two of both disaster-proofness and easiness of recovery from disaster by the route calculation processing unit 100.

Here, the route calculation processing unit 100 calculates, in accordance with the following (1) and (2), a plurality of routes in consideration of two of both the disaster-proofness and the easiness of recovery from disaster.

(1) An existing route search technique (for example, the route search technique and depth-first search disclosed in Non-Patent Literature 1, or the like) is used to calculate a plurality of routes including a geographically close route and divide the plurality of these calculated routes into groups each having a similar degree of the disaster-proofness. This is because the existing route search technique cannot calculate a route on the basis of two parameters of the disaster-proofness and the easiness of recovery from disaster.

Note that the geographically close routes may highly probably pass through the same node or the same link with each other, and thus, may have similar disaster-proofness. For this reason, the geographically close routes are generally grouped into the same group having the similar disaster-proofness with each other.

(2) Next, among the routes in the same group (that is, the routes having the similar disaster-proofness), a route having a long length of a link passing through a road with a lower failure rate (for example, an emergency transportation road or the like) is set as a route easy to recover from disasters. This is because if the road is not collapsed, the disaster-affected facilities (for example, the conduits or the like) are easy to recover. Note that the configuration of the route calculation apparatus 10 illustrated in FIG. 1 is an example, and may be another configuration. For example, the route calculation apparatus 10 illustrated in FIG. 1 may include a plurality of apparatuses.

Hardware Configuration of Route Calculation Apparatus 10

Figure 2:
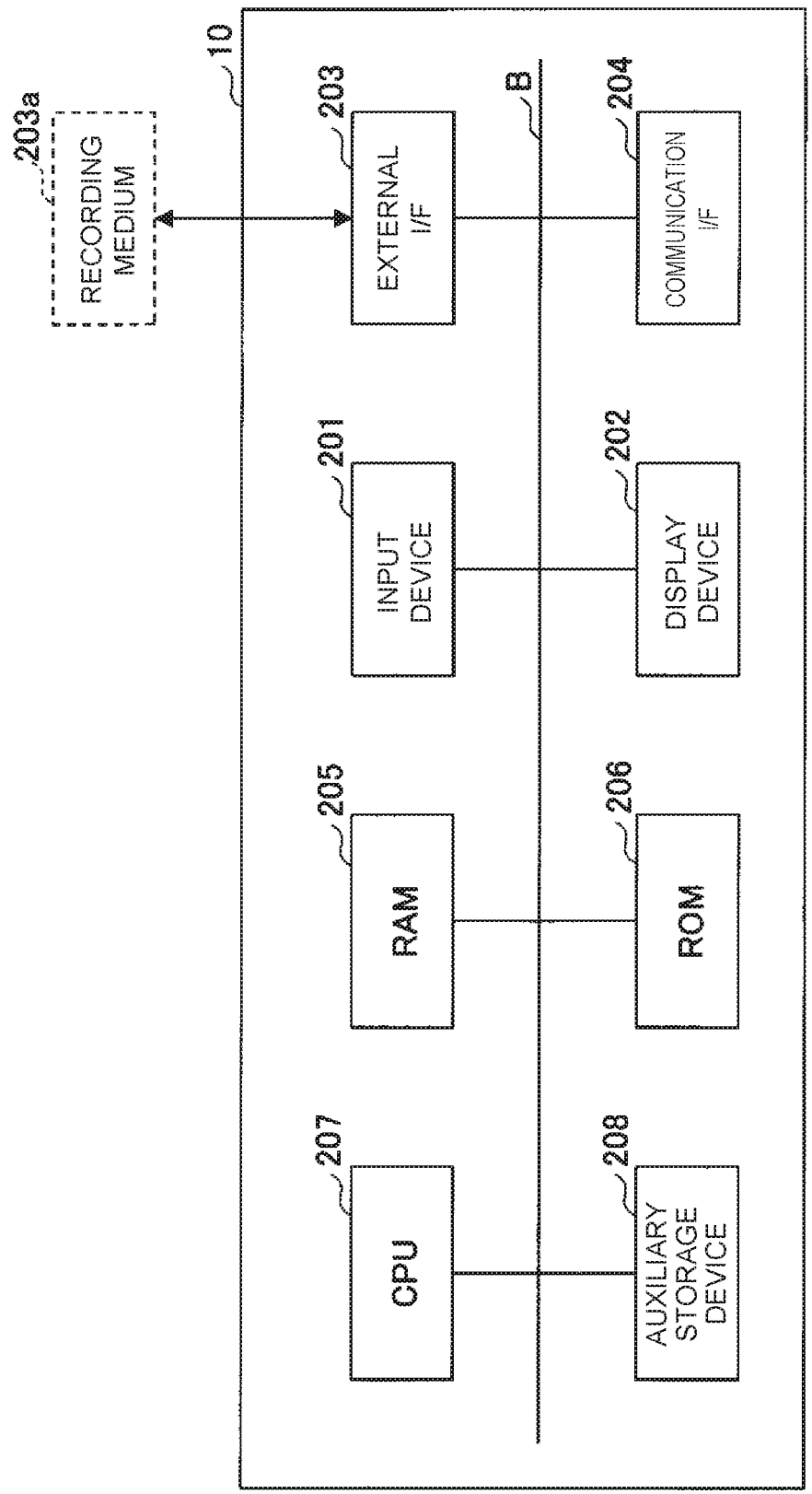
FIG. 2 is a diagram illustrating an example of a hardware configuration of the route calculation apparatus according to an embodiment of the present invention.

Next, a hardware configuration of the route calculation apparatus 10 according to an embodiment of the present invention is described with reference to FIG. 2. FIG. 2 is a diagram illustrating an example of the hardware configuration of the route calculation apparatus 10 according to an embodiment of the present invention.

As illustrated in FIG. 2, the route calculation apparatus 10 according to an embodiment of the present invention includes an input device 201, a display device 202, an external I/F 203, a communication I/F 204, a RAM (Random Access Memory) 205, a ROM (Read Only Memory) 206, a CPU (Central Processing Unit) 207, and an auxiliary storage device 208. These hardware devices are communicably connected to each other via a bus B.

The input device 201 includes, for example, a keyboard, a mouse, a touch panel, or the like, and is used for a user to input various operations. The display device 202 includes, for example, a display, and displays a result of the processing by the route calculation apparatus 10. Note that the route calculation apparatus 10 may not include at least one of the input device 201 and the display device 202.

The external I/F 203 is an interface with an external device. The external device includes a recording medium 203a or the like. The route calculation apparatus 10 can read and write from and into the recording medium 203a or the like via the external I/F 203.

The recording medium 203a includes, for example, a flexible disk, a CD (Compact Disc), a DVD (Digital Versatile Disk), an SD memory card (Secure Digital memory card), a USB (Universal Serial Bus) memory card, or the like.

The communication I/F 204 is an interface for the route calculation apparatus 10 to communicate with other apparatuses or the like.

The RAM 205 is a volatile semiconductor memory transitorily holding a program or data. The ROM 206 is a non-volatile semiconductor memory capable of holding a program or data even if power is off. The ROM 206 stores therein, for example, an OS (Operating System) configuration or the like.

The CPU 207 is an arithmetic device that reads the program or data from the ROM 206, the auxiliary storage device 208, or the like into the RAM 205 to perform the processing.

The auxiliary storage device 208 includes, for example, an HDD (Hard Disk Drive), an SSD (Solid State Drive), or the like, and is a non-volatile storage device storing a program or data therein. The program or data stored in the auxiliary storage device 208 includes, for example, the OS, application software implementing various functions on the OS, a program implementing the route calculation processing unit 100, or the like.

The route calculation apparatus 10 according to an embodiment of the present invention has the hardware configuration illustrated in FIG. 2, thereby can implement various processes described later.

Functional Configuration of Route Calculation Processing Unit 100

Figure 3:
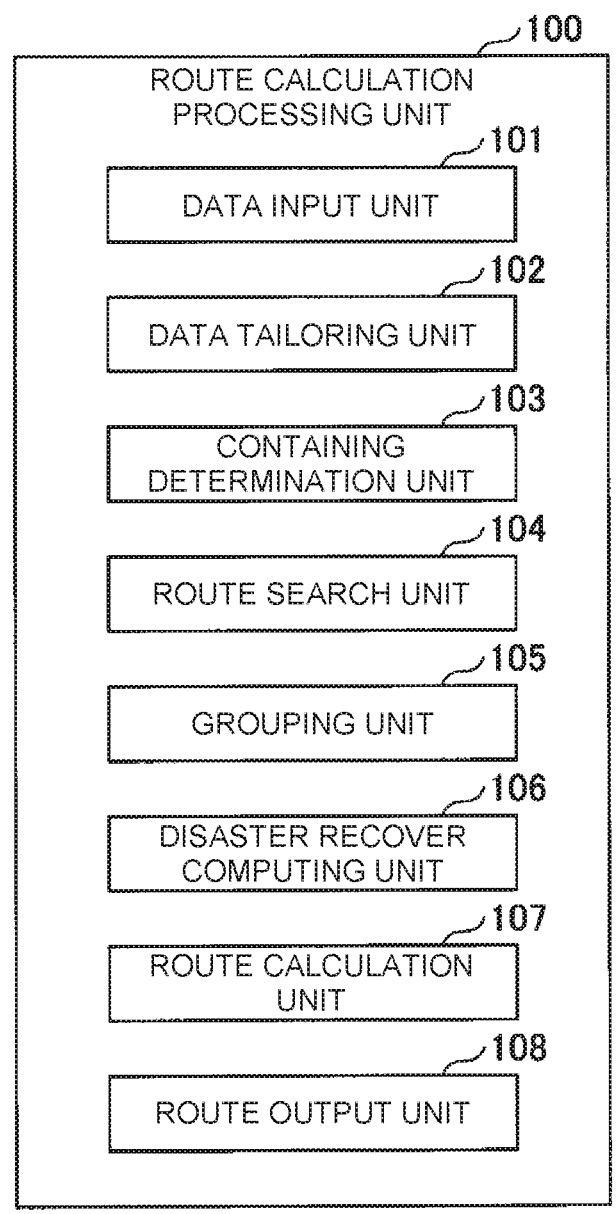
FIG. 3 is a diagram illustrating an example of a functional configuration of a route calculation processing unit according to an embodiment of the present invention.

Next, a functional configuration of the route calculation processing unit 100 according to an embodiment of the present invention is described with reference to FIG. 3. FIG. 3 is a diagram illustrating an example of the functional configuration of the route calculation processing unit 100 according to an embodiment of the present invention.

As illustrated in FIG. 3, the route calculation processing unit 100 according to an embodiment of the present invention includes a data input unit 101, a data tailoring unit 102, a containing determination unit 103, a route search unit 104, a grouping unit 105, a disaster recover computing unit 106, a route calculation unit 107, and a route output unit 108. The route calculation processing unit 100 is implemented through processes which one or more programs installed in the route calculation apparatus 10 cause the CPU 207 to execute.

The data input unit 101 inputs various pieces of information. The various pieces of information input through the data input unit 101 may include, for example, start-end point node information, network information, disaster information, road information, multi-objective function information, threshold information, and group number information.

The start-end point node information is information respectively indicating a node as a start point (hereinafter, also referred to as a "start point node") and a node as an end point (hereinafter, also referred to as an "end point node") in the route search in the network (also referred to as a "path search"). Note that a route searched by the route search is represented by combination of links from the start point node to the end point node.

The network information is information including information about nodes constituting a network (hereinafter, also referred to as "node information") and information about links constituting the network (hereinafter, also referred to as "link information"). As described above, the node refers to, for example, a housing station building, a router, a manhole, a power pole, or the like, and the link refers to a communication cable, a service tunnel, a utility corridor, a conduit, or the like. Hereinafter, in an embodiment of the present invention, a conduit is assumed as a link.

Here, in the network information, attribute information may be added to the node information and the link information. The attribute information is information about, the attribute of the node or the link, and includes, for example, location information (latitude/longitude information or the like), a length of link (hereinafter, also referred to as a "link length" if necessary), a disaster-affected rate of a link, whether a disaster area is overlapped or not, or the like. The disaster area is an area reached by an influence of a damage or the like caused by disaster occurrence. Additionally, the disaster refers to a natural disaster or a secondary disaster involved by occurrence of the natural disaster, and includes, for example, a tsunami, a landslide disaster, a flood, an earthquake, a liquefaction, a ground subsidence, a snowslide, a lightning strike, a volcanic explosion, or the like. However, a disaster may include a man-made disaster.

Note that the network information including the node information and the link information both of which are added with the attribute information may be input by the data input unit 101, or the network information including the node information and the link information at least one of which is not added with the attribute information may be input by the data input unit 101.

The road information is information about an attribute of a road. The road information includes, for example, the location information (latitude/longitude information or the like), a length of a road, a road width, a road type indicating an expressway, a general road, or the like. In an embodiment of the present invention, the road information on the emergency transportation road is input by the data input unit 101. Note that the emergency transportation road is also referred to as an emergency transportation track, which is a road to facilitate emergency transportation for escaping, rescuing, assistance goods supply or the like caused by an earthquake disaster or the like. The emergency transportation road is, for its application, generally a road with a lower failure rate, where a construction along the road is made earthquake-resistant or the like, for example.

The multi-objective function information is information about a multi-objective function for evaluating the disaster-proofness of each route. The multi-objective function includes, for example, a disaster-affected rate of a link, the number of links overlapping a disaster area, a length of a link overlapping a disaster area, or the like. Note that the multi-objective function to be used may include, for example, costs for the facilities (links) constituting the network (cost for facilities themselves, installation cost, maintenance cost, or the like), which do not evaluate the disaster-proofness though.

The multi-objective function information includes ranking information for the multi-objective function. The ranking information is information about priority of the multi-objective function. For example, in a case where the route search technique disclosed in Non-Patent Literature 1 is used, the evaluation can be performed on a priority basis by use of a value of the multi-objective function having a high priority in accordance with the ranking information. Any number of one or more multi-objective functions and the multi-objective function information including these pieces of ranking information are input by the data input unit 101. Hereinafter, a first multi-objective function, a second multi-objective function, a third multi-objective function and so on are designated in descending order of the priority.

The threshold information is information for grouping routes close each other in value of the multi-objective function. The threshold information includes, for example, a rate, the number, or the lengths of the same links among the links constituting the routes, or the like. For example, in a case where the threshold information is that "the number of the same links among links constituting a route is five or more", if five or more links are the same between links constituting a route 1 and links constituting a route 2, the route 1 and the route 2 are grouped into the same group. Note that the threshold information may be a combination of, for example, a rate, the number, the link length, or the like. For example, "the number of the same links among links constituting a route is five or more, and a sum of link lengths of the same these links is 500 m or more", and so on.

The group number information is information indicating how many groups the routes close each other in value of the multi-objective function are grouped into. The group number information is provided in integer value. For example, if the group number information indicates three, each route is grouped into three groups.

Hereinafter, assuming that disasters are "tsunami" and "liquefaction", the multi-objective function includes a first multi-objective function and a second multi-objective function described in the following.

The first multi-objective function: a length $l_t$ [m] of a link contained in a tsunami area The second multi-objective function: a length $l_s$ [m] of a link contained in a liquefaction area.

Note that in an embodiment of the present invention, assume that the disasters are "tsunami" and "liquefaction" as described above without limitation, and any number of disasters may be assumed. The number of assumed disasters is not limited to two, and any number of disasters may be assumed.

The data tailoring unit 102 tailors the various information input by the data input unit 101 as needed. For example, in a case where the road information on the emergency transportation road is not provided with a road width (or, in a case where 0 or null is set as a road width, or the like), the data tailoring unit 102 tailor the relevant road information to provide a road width to the road information on the emergency transportation road. This is because when the containing determination unit 103 determines whether or not each of the links constituting the network is contained in the emergency transportation road, the road width of the emergency transportation road is required.

The containing determination unit 103 determines whether or not a disaster area contain each of the links constituting the network indicated by the network information input by the data input unit 101, and determines whether or not an emergency transportation road contains each of these links. The link contained in a disaster area refers to a link at least a part of which overlaps the disaster area. Additionally, the link contained in an emergency transportation road refers to a link at least a part of which overlaps a road width of the emergency transportation road.

The route search unit 104 searches for a plurality of routes from the start point node to the end point node of the network indicated by the network information (includes a geographically close route) on the basis of the start-end point node information, the multi-objective function information, or the like input by the data input unit 101. The route search technique to be used may include, for example, the route search technique, depth-first search or the like disclosed in Non-Patent Literature 1 as described above.

The grouping unit 105 groups a plurality of routes searched for by the route search unit 104 into groups of routes having the similar disaster-proofness on the basis of the threshold information, group number information, or the like input by the data input unit 101.

The disaster recover computing unit 106 computes easiness of recovery from disaster of each of a plurality of routes searched for by the route search unit 104. A parameter to be used indicating the easiness of recovery from disaster includes a link length of a link difficult to recover from disasters among links constituting a route. The link difficult to recover from disasters includes, for example, a link contained in the tsunami area, a link contained in the liquefaction area and not contained in the emergency transportation road, or the like. However, the links which are contained in the emergency transportation road but not continuous, and an initial link and a last link of the links which are contained in the emergency transportation road and continuous are excluded from the links contained in the emergency transportation road.

The route calculation unit 107 calculates a route easy to recover from disasters among each route in the same group with respect to each of the groups grouped by the grouping unit 105. That is, the route calculation unit 107 selects, among each route in the same group, a route low in a value of a parameter indicating the easiness of recovery from disaster (in other words, a route short in a link length of a link difficult to recover from disasters). In this way, a route easy to recover from disasters is calculated from among the routes that are similarly disaster-proof, and thus, a route is calculated in consideration of the disaster-proofness and the easiness of recovery from disaster.

The route output unit 108 outputs the routes calculated by the route calculation unit 107. The route output unit 108 may output all routes calculated for each group, or may output a predetermined number of routes among these routes, for example. Additionally, as for an output destination of the route, the output may be made to the display device 202, the auxiliary storage device 208, the recording medium 203a, or the like and other apparatuses or the like connected via the network.

Process Performed by Route Calculation Processing Unit 100

Figure 4:
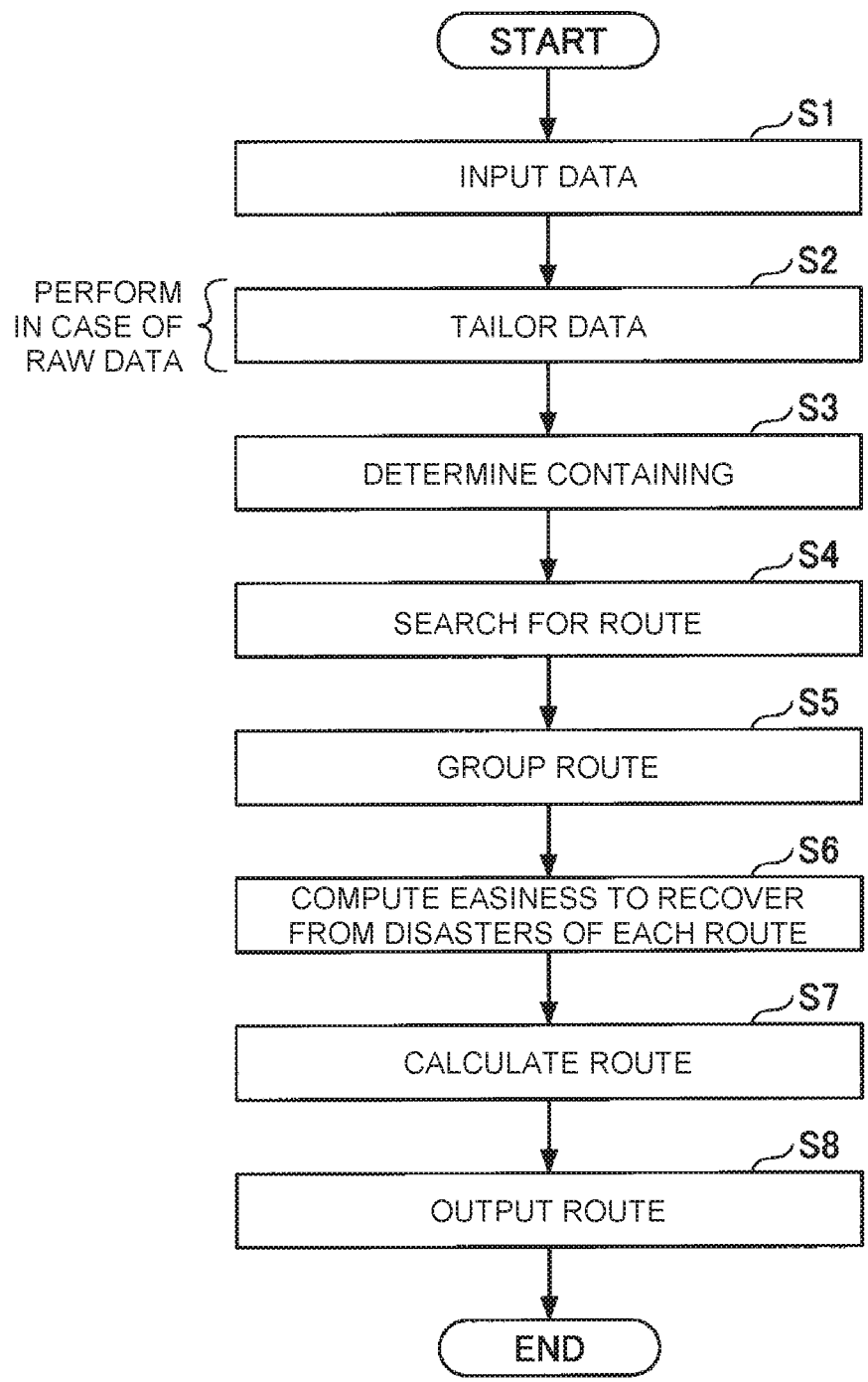
FIG. 4 is a flowchart illustrating an example of a process performed by the route calculation processing unit according to an embodiment of the present invention.

Next, a process performed by the route calculation processing unit 100 is described with reference to FIG. 4. FIG. 4 is a flowchart illustrating an example of the process performed by the route calculation processing unit 100 according to an embodiment of the present invention.

Step S1: the data input unit 101 inputs various information (for example, the start-end point node information, the network information, the disaster information, the road information, the multi-objective function information, the threshold information, the group number information, or the like). Hereinafter, assume that the road information input by the data input unit 101 (the road information on the emergency transportation road) is not provided with a road width. Note that the road information not provided with a road width is also referred to as linestring road information.

Figure 5:
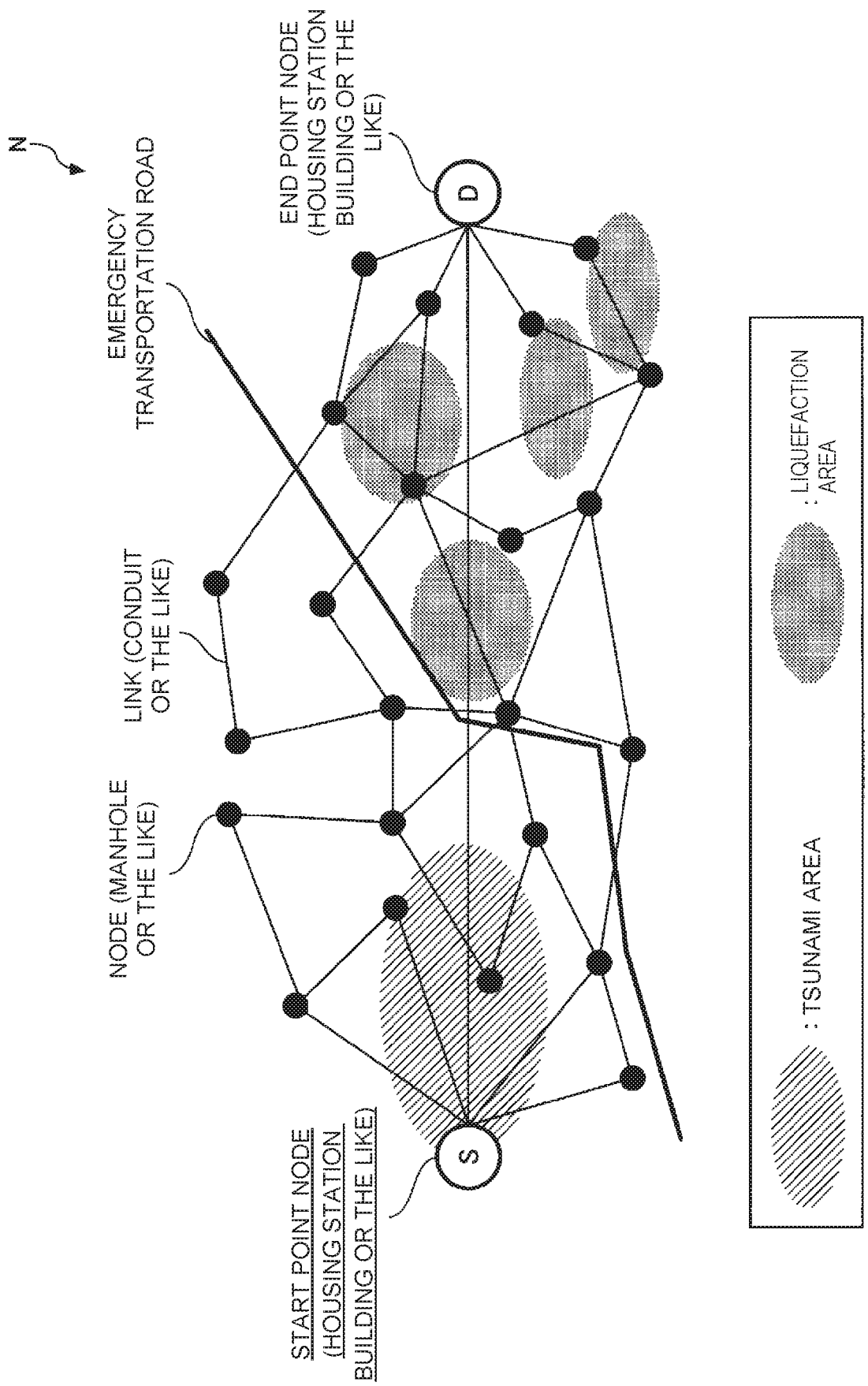
FIG. 5 is a diagram illustrating an example of a network.

Here, FIG. 5 illustrates an example of a network N indicated by the network information input by the data input unit 101. The network N illustrated in FIG. 5 is constituted by the nodes and the links. Among the nodes included in the network N illustrated in FIG. 5, nodes indicated by the start-end point node information are the start point node and the end point node. The network N also includes a tsunami area and a liquefaction area as disaster areas. Furthermore, the network N includes an emergency transportation road indicated by the road information. Note that in the example indicated in FIG. 5, the emergency transportation road, of which the road information is not provided with a road width, is therefore represented by a line segment having no width.

In the example indicated in FIG. 5, the start point node and the end point node refer to a housing station building or the like, the node refers to a manhole or the like, and the link refers to a conduit or the like. Note that the network N indicated by the network information is not limited to an electrical communication network or a communication net. For example, the network N may include various networks such as an electric power grid, a waterwork or sewerage system, a gas pipe system, a road system, and a railway system.

Step S2: the data tailoring unit 102 tailors the various information input by the data input unit 101 as needed. Note that in a case where the data tailoring is not needed (for example, in a case where the road information on the emergency transportation road is provided with a road width, or the like), this process in step S2 may not be performed.

Figure 6:
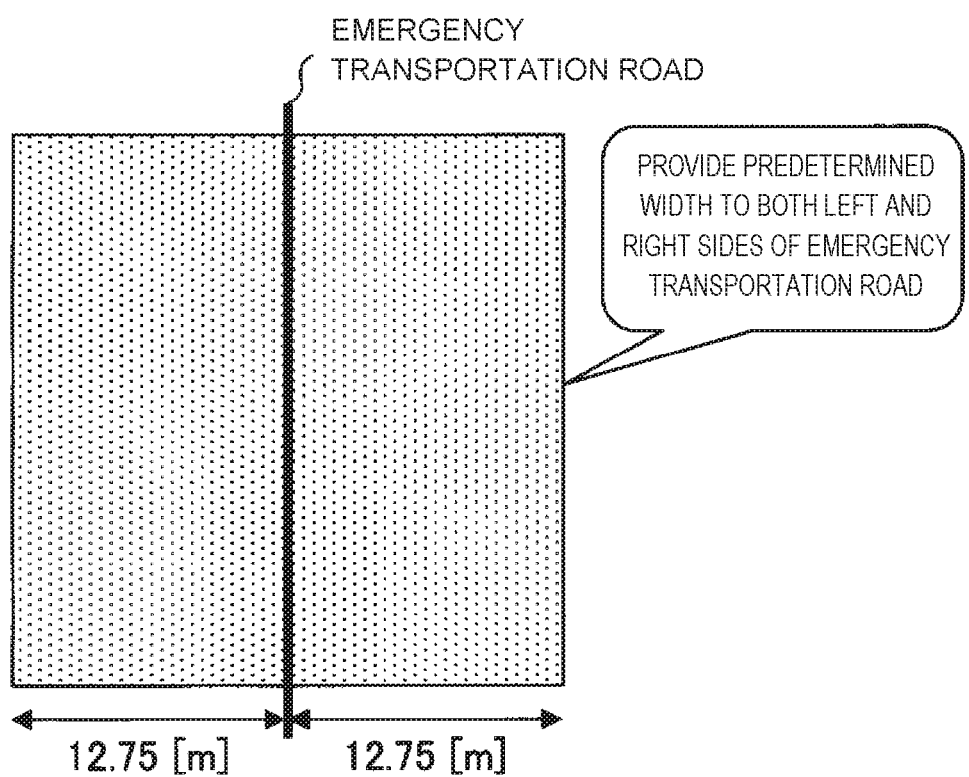
FIG. 6 is an explanatory diagram illustrating an example of data tailoring.

In a case where the road information on the emergency transportation road is provide with a road width, the data tailoring unit 102 can set a predetermined any value as a road width. For example, as illustrated in FIG. 6, a width of 12.75 [m] may be provided to both left and right sides of the emergency transportation road to provide a road width of 25.5 [m]. This provides the maximum road width defined by the Government Order on Road Design Standards. By doing so, for example, the links indicating the facilities (for example, conduits or the like) located along the emergency transportation road can be determined as links contained in the relevant emergency transportation road.

On the other hand, for example, the location information included in the link information may have an error (a difference from a true value) in some cases. In this case, as illustrated in FIG. 7(*a*), even if the road width of 25.5 [m] is provided to the road information on the emergency transportation road, the link may not contained in the road width. For this reason, in spite of the link indicating the facility located along the emergency transportation road, the relevant link is determined not to be contained in the emergency transportation road. Then, in this case, as illustrated in FIG. 7(*b*), a further width is additionally provided to both the left and right sides of the emergency transportation road, such that no other links are contained in the added widths. In the example illustrated in FIG. 7(*b*), a further width of 17.25 [m] is additionally provided to both the left and right of the emergency transportation road to provide a road width of 60 [m]. By doing so, even if in the case where the location information included in the link information has an error, the link indicating the facility located along the emergency transportation road can be determined as a link contained in the relevant emergency transportation road.

Figure 8:
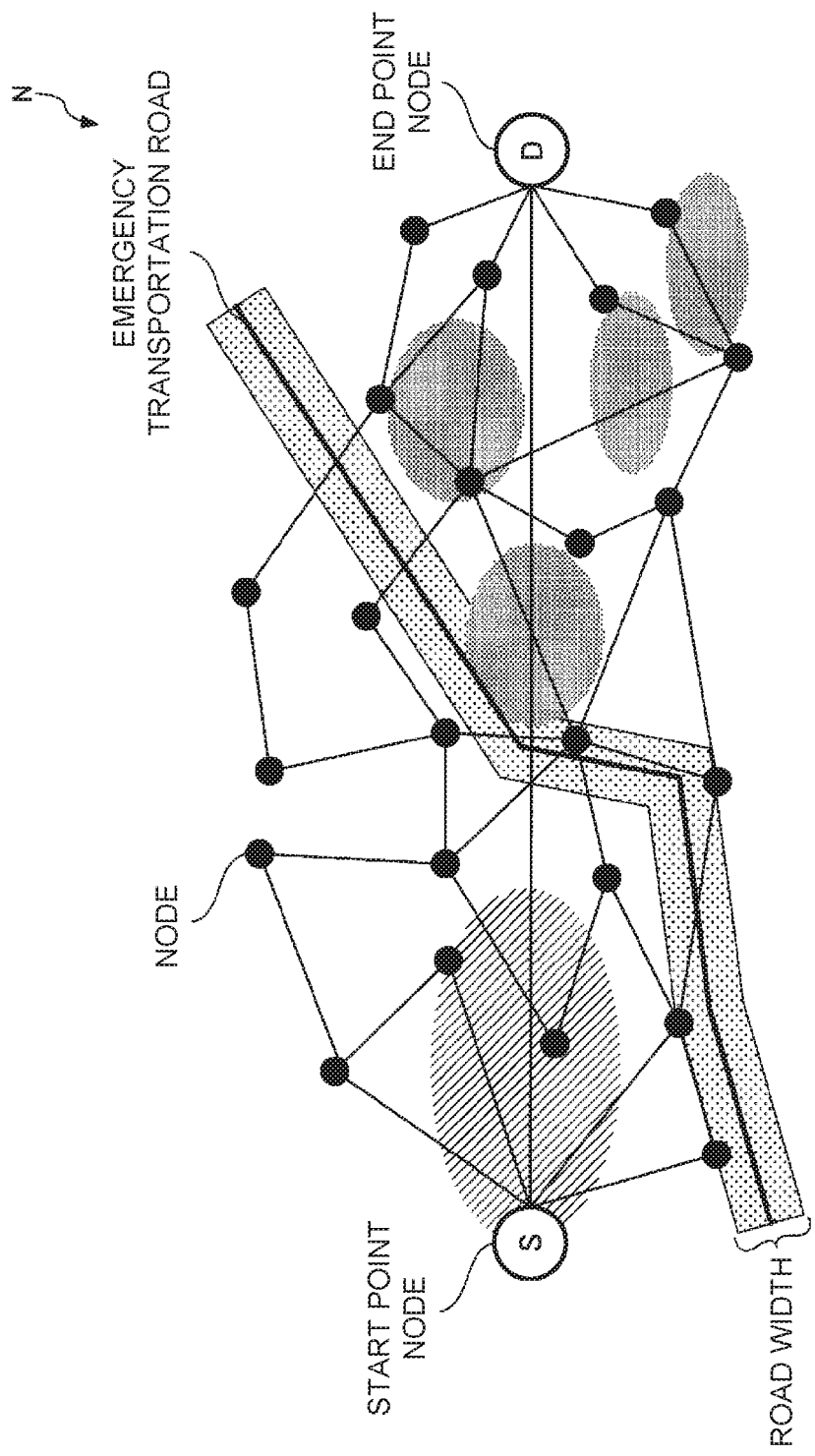
FIG. 8 is a diagram illustrating an example of a network including an emergency transportation road provided with a road width.

Here, FIG. 8 illustrates the network N including the emergency transportation road of which the road information has been provided with the road width by the data tailoring unit 102. As illustrated in FIG. 8, the emergency transportation road is provided with the road width. Note that the example illustrated in FIG. 8 illustrates a case where the emergency transportation road is provided with a constant road width, but, for example, a different road width may be provided depending on a road section constituting the emergency transportation road without limitation.

Step S3: the containing determination unit 103 determines whether or not the disaster area contain each of the links constituting the network indicated by the network information input by the data input unit 101, and determines whether or not the emergency transportation road contains each of these links.

Figure 9:
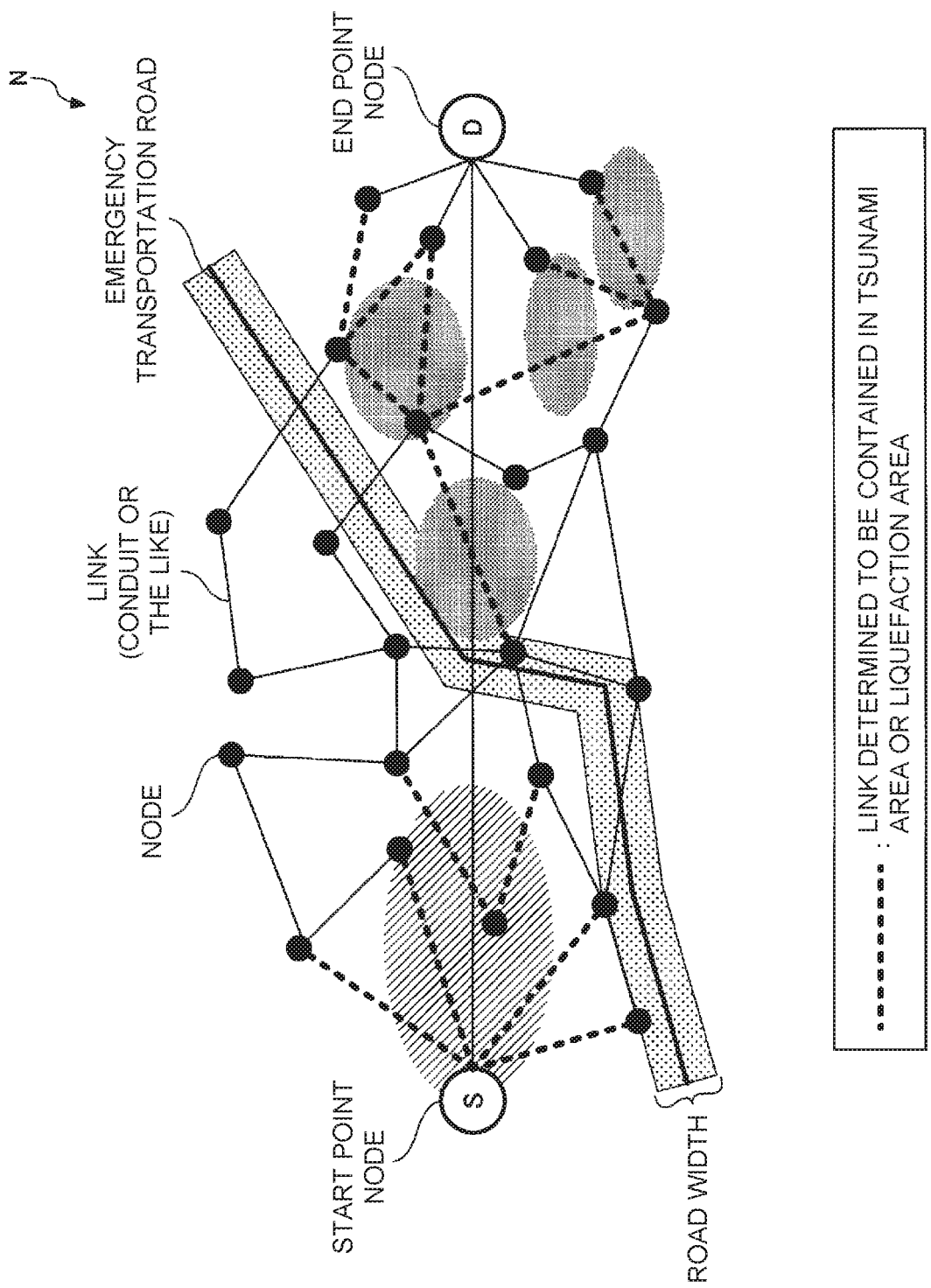
FIG. 9 is an explanatory diagram illustrating an example of containing determination on a disaster area.

As described above, the link contained in the disaster area refers to a link at least a part of which overlaps the disaster area. Among each of the links constituting the network N, a link determined to be contained in the disaster area is illustrated in FIG. 9. As illustrated in FIG. 9, if at least a part of the link overlaps the disaster area, the link is determined to be contained in the relevant disaster area.

The link information on the link determined to be contained in the disaster area is provided with the attribute information as "tsunami area" or "liquefaction area" or the like, for example. The "tsunami area" is provided in a case where a link is determined to be contained in the tsunami area. On the other hand, the "liquefaction area" is provided in a case where a link is determined to be contained in the liquefaction area. Note that, without specifying the disaster type, the attribute information may be provided as "disaster area" indicating that a link overlaps some disaster area, for example.

Figure 10:
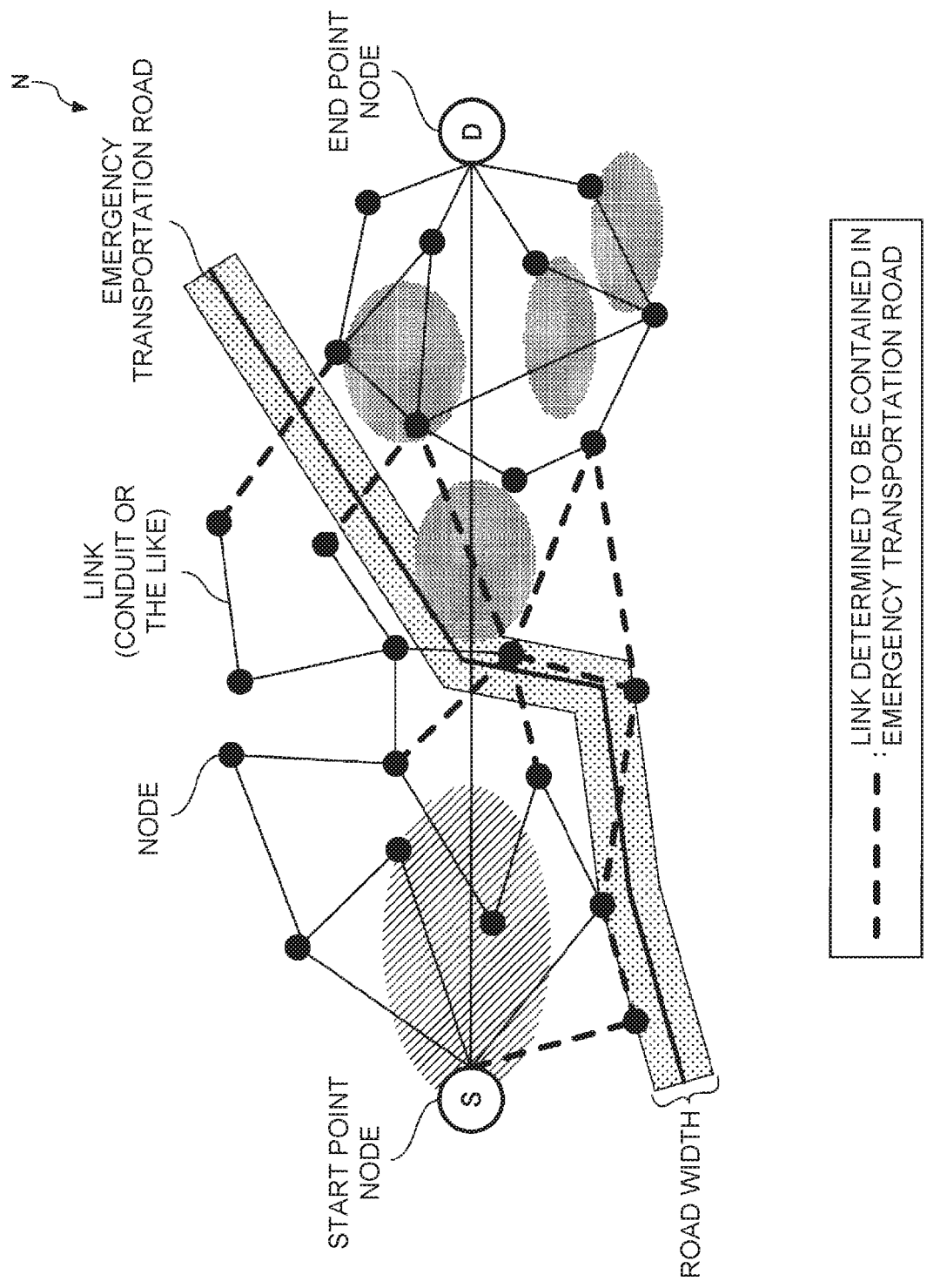
FIG. 10 is an explanatory diagram illustrating an example of containing determination on an emergency transportation road.

As described above, the link contained in the emergency transportation road refers to a link at least a part of which overlaps the road width of the emergency transportation road. Among each of the links constituting the network N, a link determined to be contained in the emergency transportation road is illustrated in FIG. 10. As illustrated in FIG. 10, if at least a part of a link overlaps the road width of the emergency transportation road, the link is determined to be contained in the relevant emergency transportation road. As illustrated in FIG. 10, not only the link indicating the facility located along the emergency transportation road, but also, for example, a link connected to the link indicating the facility located along the emergency transportation road, a link indicating a facility located across the emergency transportation road, or the like are determined to be contained in the relevant emergency transportation road. Note that a range (area) indicated by the road width of the emergency transportation road is an example of a road area in claims.

The link information on the link determined to be contained in the emergency transportation road is provided with the attribute information as "emergency transportation road" indicating that the link overlaps the road width of the emergency transportation road, for example.

Here, a case may be conceivable where one link is determined to be contained in both the disaster area and the emergency transportation road. In this case, the link information on the relevant link is provided with the attribute information as both the "disaster area" indicating that the link overlaps the disaster area and the "emergency transportation road" indicating that the link overlaps the road width of the emergency transportation road, for example.

Note that in an embodiment of the present invention, the containing determination is made on each of the links constituting the network indicated by the network information, but in addition to this, the containing determination may be made also on each of the nodes constituting the relevant network.

Step S4: the route search unit 104 searches for a plurality of routes from the start point node to the end point node of the network indicated by the network information (includes a geographically close route) on the basis of the start-end point node information, the objective function information, or the like input by the data input unit 101. The route search technique to be used may include, for example, the route search technique and depth-first search disclosed in Non-Patent Literature 1 as described above.

Figure 11:
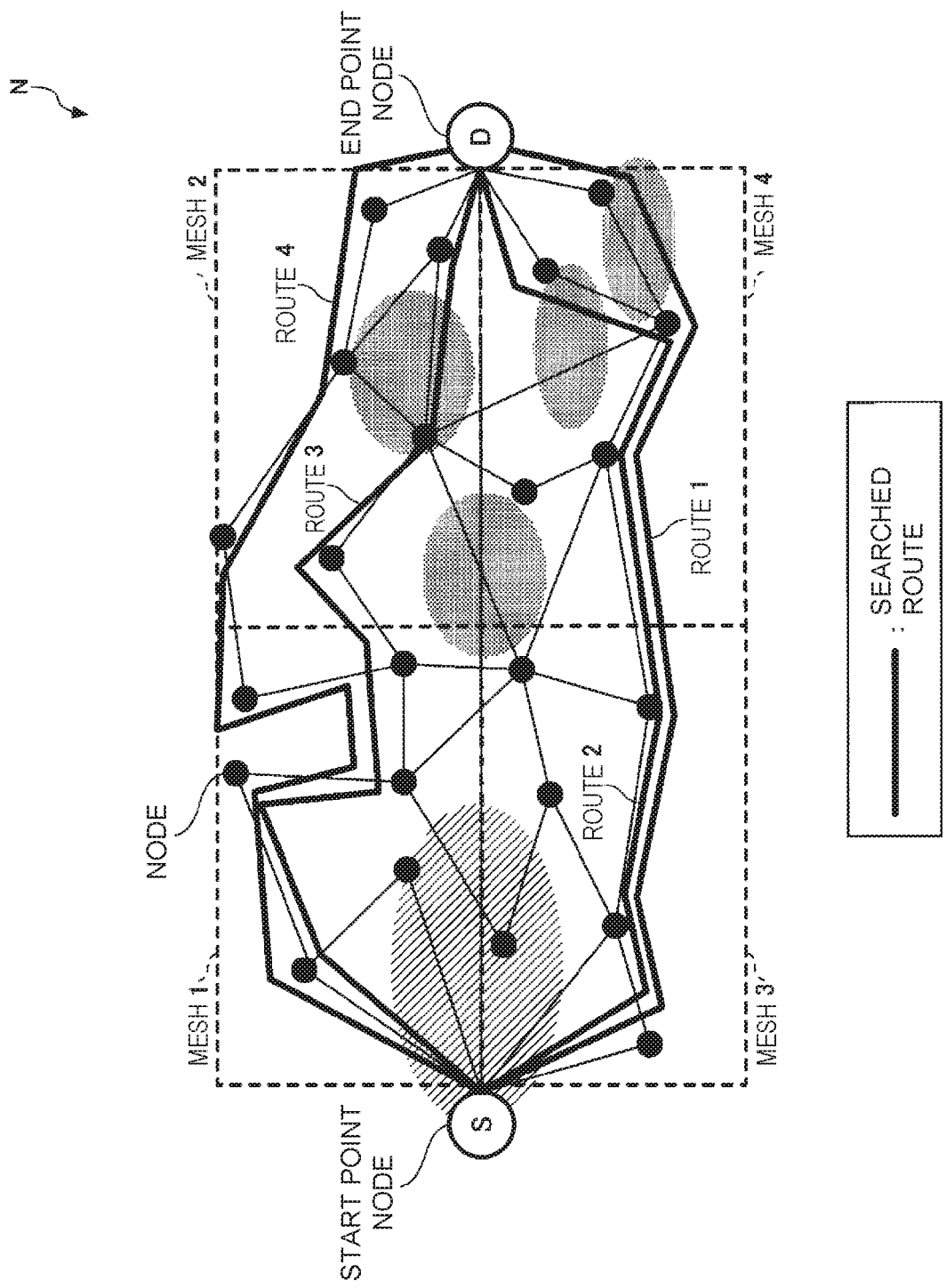
FIG. 11 is a diagram illustrating an example of a searched route.

Here, as an example, FIG. 11 illustrates a case where four routes (route 1 to route 4) are searched for by use of the route search technique disclosed in Non-Patent Literature 1. In Non-Patent Literature 1, the network N is divided into small regions (meshes) and then route search is performed for each combination of meshes (mesh combination). In the example illustrated in FIG. 11, the network N is divided into four meshes, a mesh 1 and a mesh 2 are set as one mesh combination and a mesh 3 and a mesh 4 are set as another one mesh combination to search for two routes in each mesh combination.

At this time, the route search unit 104 calculates a value of the first multi-objective function and a value of the second multi-objective function of each route. The value of the first multi-objective function (the length $l_t$ of the link contained in the tsunami area) and the value of the second multi-objective function (the length $l_s$ of the link contained in the liquefaction area) represent the disaster-proofness. The smaller the value of the first multi-objective function and the smaller (shorter) the value of the second multi-objective function, the more disaster-proof the route is.

Step S5: the grouping unit 105 groups a plurality of routes searched for by the route search unit 104 into groups of routes having the similar disaster-proofness on the basis of the threshold information, group number information, or the like input by the data input unit 101.

Here, for example, in a case where the threshold information is that "among the links constituting a route, the number of the same links is a predetermined number or more", and the group number information indicates "2", the route 1 to the route 4 illustrated in FIG. 11 are grouped into a group including the route 1 and the route 2 (referred to as a "group 1") and a group including the route 3 and the route 4 (referred to as a "group 2").

Note that in the route search technique disclosed in Non-Patent Literature 2, a plurality of routes are calculated for each mesh combination determined based on the type or the number of disasters or the like, and therefore, the routes calculated from the same mesh combination having similar disaster-proofness. Thus, in the route search technique disclosed in Non-Patent Literature 2, each of the mesh combinations may be grouped such that one mesh combination is one group.

Step S6: the disaster recover computing unit 106 computes easiness of recovery from disaster of each of a plurality of routes searched for by the route search unit 104.

Here, as described above, a parameter to be used indicating the easiness of recovery from disaster includes a link length of a link difficult to recover from disasters among links constituting a route. Then, firstly, concerning each of the routes searched for by the route search unit 104, the disaster recover computing unit 106 classifies each of the links constituting the relevant route into any of "difficult recover from disasters", "easy recover from disasters", and "no link disaster". Among these, a link classified into "difficult recover from disasters" is a link difficult to recover from disasters.

Figure 12:
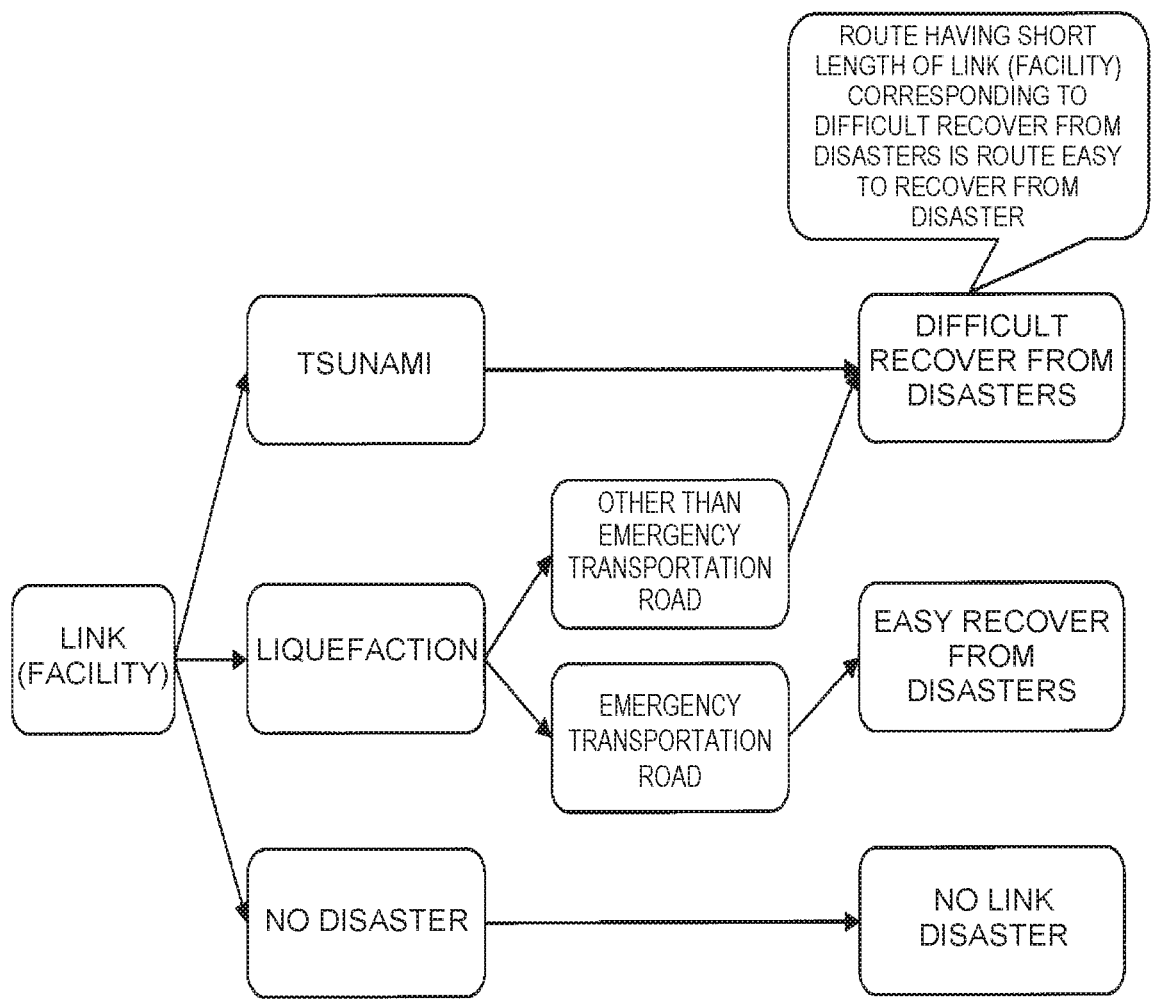
FIG. 12 is an explanatory diagram illustrating an example of classification of links.

For example, as illustrated in FIG. 12, in a case where the attribute information for the link information are not provided as the "tsunami area" and the "liquefaction area" (that is, in a case where the link overlaps no disaster area), the link corresponding to the relevant link information is classified into "no link disaster". In this case, the link is not affected by disasters, and thus, the recover from disasters is not needed to be considered.

Additionally, for example, as illustrated in FIG. 12, the attribute information for the link information is provided as the "tsunami area" (that is, in a case where the link overlaps the tsunami area), the link corresponding to the relevant link information is classified into "difficult recover from disasters". This is because in a case of a tsunami, road sinking or collapse or the like may possibly occur even in the emergency transportation road. Note that another example of such disasters may include a landslide disaster or the like. Therefore, for example, a link overlapping a landslide disaster area is also classified into "difficult recover from disasters".

On the other hand, for example, as illustrated in FIG. 12, in a case where the attribute information for the link information is provided as the "liquefaction area" (that is, in a case where the link overlaps the liquefaction area), the link is classified further depending on whether or not the "emergency transportation road" is provided. In a case where the "emergency transportation road" is not provided, the relevant link is classified into "difficult recover from disasters". On the other hand, in a case where the "emergency transportation road" is provided, the relevant link is classified into "easy recover from disasters".

However, at this time, even in the case where the attribute information is provided as the "emergency transportation road", a link described in the following (1) or (2) is dealt with as one not provided with the "emergency transportation road" in the classification.

(1) Links in a case where the links are provided with the attribute information as the "emergency transportation road" but not continuous.

Figure 13:
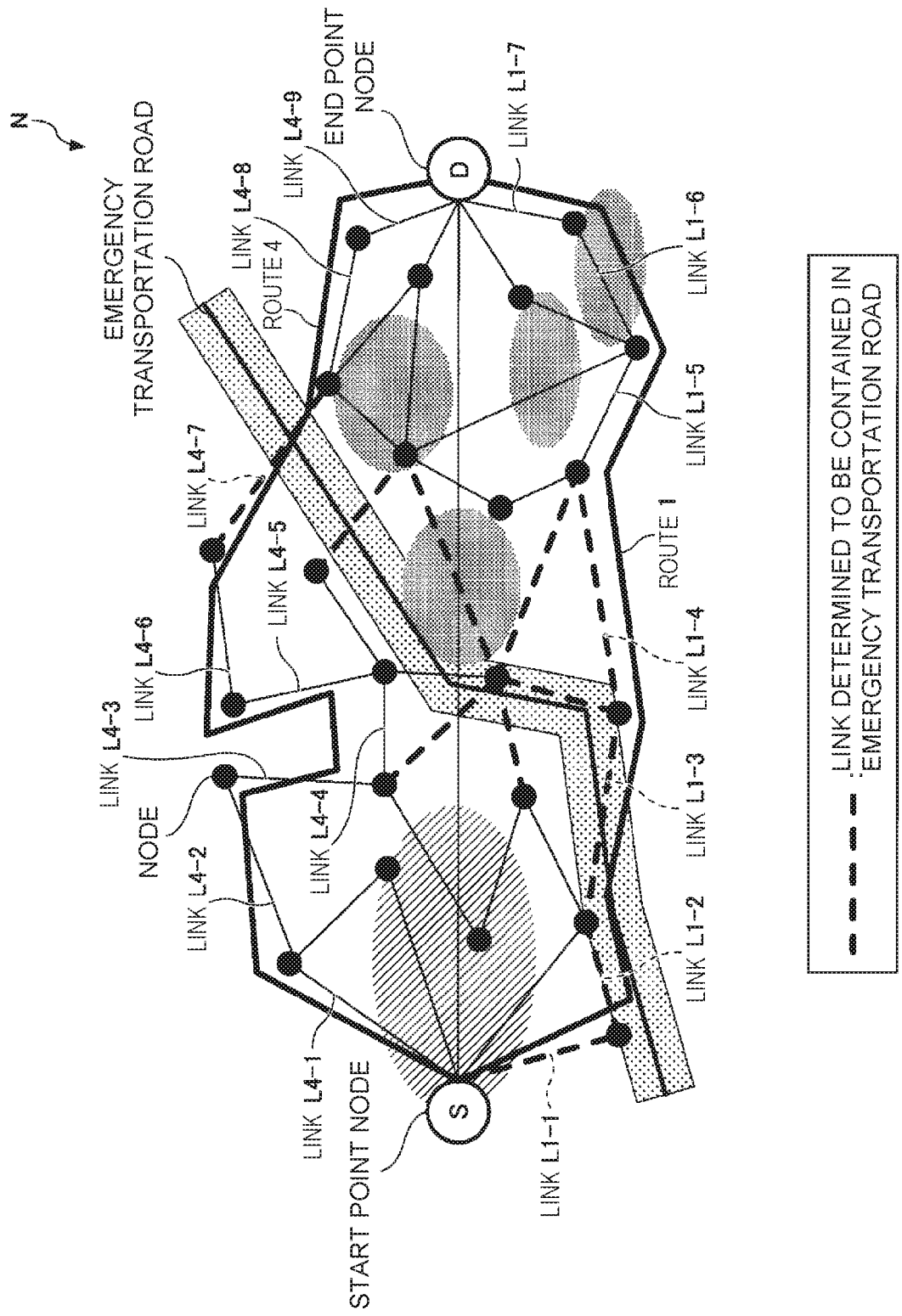
FIG. 13 is an explanatory diagram illustrating an example of a link determined not to be an emergency transportation road.

For example, as illustrated in FIG. 13, assume that the links constituting the route 4 searched in step S4 described above are a link L4-1 to a link L4-9 in order from the start point node. In this case, link information on the link L4-7 is provided with the attribute information as the "emergency transportation road", but link information on the link L4-6 and link L4-8 are not provided with the attribute information as the "emergency transportation road". Therefore, the link L4-7 is dealt with as one not provided with the "emergency transportation road" in the classification.

This is because the links which are provided with the attribute information as the "emergency transportation road" but not continuous are not links indicating the facilities located along the emergency transportation road but are links across the emergency transportation road.

(2) An initial link and a last link of the links in a case where the links are provided with the attribute information as the "emergency transportation road" and continuous For example, as illustrated in FIG. 13, assume that the links constituting the route 1 searched in step S4 described above are a link L1-1 to a link L1-7 in order from the start point node. In this case, each of the link information on the link L1-1 to the link L1-4 is provided with the attribute information as the "emergency transportation road". Therefore, among these link L1-1 to the link L1-4, the initial link L1-1 and the last link L1-4 are dealt with as ones not provided with the "emergency transportation road" in the classification.

This is because the initial link and the last link of the links in the case where links are provided with the attribute information as the "emergency transportation road" and continuous are not links indicating the facilities located along the emergency transportation road.

In this way, each of the links constituting the network are classified into any of "difficult recover from disasters", "easy recover from disasters", and "no link disaster". A route constituted by the links classified into "difficult recover from disasters" with a sum of the link lengths being short is a route easy to recover from disasters.

Then, next, the disaster recover computing unit 106 computes a sum of the link lengths of the links classified into "difficult recover from disasters" for each route. This may be obtained by summing the link lengths included in the link information on the links classified into "difficult recover from disasters" for each route.

According to the above description, for example, as illustrated in FIG. 14, concerning the routes 1 to 4 searched by the route search unit 104 in step S4 described above, calculated are the parameters indicating the disaster-proofness as "length [m] of link in tsunami area" and "length [m] of link in liquefaction area", and the parameter indicating the easiness of recovery from disaster as "length [m] of link difficult to recover from disasters". Note that, as described above, it is represented that the shorter "length [m] of link in tsunami area" and "length [m] of link in liquefaction area", the more disaster-proof, and the shorter "length [m] of link difficult to recover from disasters", the easier to recover from disasters.

The example illustrated in FIG. 14 illustrates that concerning the route 1 belonging to the group 1, calculated are a length "a1" of link in the tsunami area, a length "b1" of link in the liquefaction area, and a length "c1" of link difficult to recover from disasters. In this case, for example, a value of the parameter indicating the disaster-proofness includes the length "a1" of link in the tsunami area that is a value of the first multi-objective function and the length "b1" of link in the liquefaction area that is a value of the second multi-objective function. Additionally, a value of the parameter indicating the easiness of recovery from disaster includes "c1". The same applies to the route 2 to the route 3.

Note that in an embodiment of the present invention, the lower the value of the parameter indicating the disaster-proofness, the more disaster-proof the route is, but, for example, a negative number or inverse number of the value of the parameter indicating the disaster-proofness may be set as the value of the parameter indicating the disaster-proofness such that the higher the value of the parameter indicating the disaster-proofness, the more disaster-proof the route is. The same applies to the value of the parameter indicating the easiness of recovery from disaster.

Step S7: the route calculation unit 107 calculates a route easy to recover from disasters among each of the routes in the same group. That is, the route calculation unit 107 selects, among each of the routes in the same group, a route low in a value of a parameter indicating the easiness of recovery from disaster (in other words, a route short in a link length of a link difficult to recover from disasters).

For example, in a case of c1<c2 the example illustrated in FIG. 14, the route 1 is selected from the group 1 as the route easy to recover from disasters. Similarly, in a case of c3>c4 in the example illustrated in FIG. 14, the route 4 is selected from the group 2. By doing so, a route easy to recover from disasters is calculated from among the routes that are similarly disaster-proof, and thus, a route is calculated in consideration of the disaster-proofness and the easiness of recovery from disaster.

Note that in an embodiment of the present invention, a route the easiest to recover from disasters is calculated from one group, but, for example, a plurality of routes easy to recover from disasters (for example, the top M routes, assuming that M is a predetermined positive integer) may be calculated from one group, without limitation.

Step S8: the route output unit 108 outputs the routes calculated by the route calculation unit 107.

As described above, the route calculation apparatus 10 according to an embodiment of the present invention can calculate a route in consideration of the disaster-proofness and the easiness of recovery from disaster. Therefore, the route calculation apparatus 10 according to an embodiment of the present invention can present a route that is resistant to a disaster and easy to recover even if affected by a disaster to a route designer or the like of the electrical communication network, for example.

The present invention is not limited to the specifically disclosed embodiment above, and may be variously modified or changed without departing from a scope of the claims.

REFERENCE SIGNS LIST

10 Route calculation apparatus
100 Route calculation processing unit
101 Data input unit
102 Data tailoring unit
103 Containing determination unit
104 Route search unit
105 Grouping unit
106 Disaster recover computing unit
107 Route calculation unit
108 Route output unit

The invention claimed is:

1. A route calculation method executed by a computer, the method comprising:
   a first determination procedure determining a first link which at least partially overlaps a disaster area representing a range reached by an influence of a predetermined disaster, among links constituting a network;
   a second determination procedure determining a second link which at least partially overlaps a road area representing a range of a road width of a predetermined road used to recover from the predetermined disaster, among the links constituting the network;
   a route search procedure searching for a plurality of routes from a start point node to an end point node constituting the network;
   a grouping procedure grouping the plurality of routes searched for by the route search procedure into groups depending on a first parameter value that is based on the first link included in the plurality of routes;
   a computing procedure computing, for each of the plurality of routes searched for by the route search procedure, a second parameter value that is based on the first link and the second link included in the plurality of routes;
   a selecting procedure selecting a predetermined number of routes among one or more routes grouped into the same group based on the second parameter value computed by the computing procedure for each of the groups grouped by the grouping procedure; and
   an outputting procedure outputting the selected predetermined number of routes for display on a display device or for storage on a storage device.

2. The route calculation method according to claim 1, wherein
   the grouping procedure groups the plurality of routes into groups similar in the first parameter value, based on threshold information indicating at least one of a rate, a number, or link lengths of the same links among links constituting a route.

3. The route calculation method according to claim 1, wherein
the computing procedure computes, for each of the plurality of routes, the second parameter value indicating a link length of the first link in a case where the first link included in the plurality of routes is not the second link.

4. The route calculation method according to claim 3, wherein
the disaster area includes at least a tsunami area representing a range reached by an influence of a tsunami, a landslide disaster area representing a range reached by an influence of a landslide disaster, and a liquefaction area representing a range reached by an influence of liquefaction caused by an earthquake, and
the computing procedure computes, for each of the plurality of routes, the second parameter value indicating the link length of the first link, in a case where the first parameter value represents that the first link included in the plurality of routes at least partially overlaps the tsunami area or the landslide disaster area, or represents that the first link included in the plurality of routes at least partially overlaps the liquefaction area, and the first link is not the second link.

5. The route calculation method according to claim 1, wherein
in a case where data indicating the predetermined road is not provided with a road width, the computer performs a data tailoring procedure providing a road width to the data, and
the second determination procedure determines, among the links constituting the network, the second link which at least partially overlaps a road area representing a range of the road width provided by the data tailoring procedure.

6. A route calculation apparatus comprising:
a first determination unit, including one or more processors, configured to determine a first link which at least partially overlaps a disaster area representing a range reached by an influence of a predetermined disaster, among links constituting a network;
a second determination unit, including one or more processors, configured to determine a second link which at least partially overlaps a road area representing a range of a road width of a predetermined road used to recover from the predetermined disaster, among the links constituting the network;
a route search unit, including one or more processors, configured to search for a plurality of routes from a start point node to an end point node constituting the network;
a grouping unit, including one or more processors, configured to group the plurality of routes searched for by the route search unit into groups depending on a first parameter value that is based on the first link included in the routes;
a computing unit, including one or more processors, configured to compute, for each of the plurality of routes searched for by the route search unit, a second parameter value that is based on the first link and the second link included in the routes;
a selecting unit, including one or more processors, configured to select a predetermined number of routes among one or more routes grouped into the same group based on the second parameter value computed by the computing unit for each of the groups grouped by the grouping unit; and an outputting unit, including one or more processors, configured to output the selected predetermined number of routes for display on a display device or for storage on a storage device.

7. A non-transitory computer readable medium storing one or more instructions causing a computer to execute:
a first determination procedure determining a first link which at least partially overlaps a disaster area representing a range reached by an influence of a predetermined disaster, among links constituting a network;
a second determination procedure determining a second link which at least partially overlaps a road area representing a range of a road width of a predetermined road used to recover from the predetermined disaster, among the links constituting the network;
a route search procedure searching for a plurality of routes from a start point node to an end point node constituting the network;
a grouping procedure grouping the plurality of routes searched for by the route search procedure into groups depending on a first parameter value that is based on the first link included in the routes;
a computing procedure computing, for each of the plurality of routes searched for by the route search procedure, a second parameter value that is based on the first link and the second link included in the routes;
a selecting procedure selecting a predetermined number of routes among one or more routes grouped into the same group based on the second parameter value computed by the computing procedure for each of the groups grouped by the grouping procedure; and
an outputting procedure outputting the selected predetermined number of routes for display on a display device or for storage on a storage device.

8. The route calculation apparatus according to claim 6, wherein
the grouping unit is configured to group the plurality of routes into groups similar in the first parameter value, based on threshold information indicating at least one of a rate, a number, or link lengths of the same links among links constituting a route.

9. The route calculation apparatus according to claim 6, wherein
the computing unit is configured to compute, for each of the plurality of routes, the second parameter value indicating a link length of the first link in a case where the first link included in the plurality of routes is not the second link.

10. The route calculation apparatus according to claim 9, wherein
the disaster area includes at least a tsunami area representing a range reached by an influence of a tsunami, a landslide disaster area representing a range reached by an influence of a landslide disaster, and a liquefaction area representing a range reached by an influence of liquefaction caused by an earthquake, and
the computing unit is configured to compute, for each of the plurality of routes, the second parameter value indicating the link length of the first link, in a case where the first parameter value represents that the first link included in the plurality of routes at least partially overlaps the tsunami area or the landslide disaster area, or represents that the first link included in the plurality of routes at least partially overlaps the liquefaction area, and the first link is not the second link.

11. The route calculation apparatus according to claim 6, wherein in a case where data indicating the predetermined road is not provided with a road width, the route calculation apparatus performs a data tailoring procedure providing a road width to the data, and the second determination unit is configured to determine, among the links constituting the network, the second link which at least partially overlaps a road area representing a range of the road width provided by the data tailoring procedure.

12. The non-transitory computer readable medium according to claim 7, wherein the grouping procedure groups the plurality of routes into groups similar in the first parameter value, based on threshold information indicating at least one of a rate, a number, or link lengths of the same links among links constituting a route.

13. The non-transitory computer readable medium according to claim 7, wherein the computing procedure computes, for each of the plurality of routes, the second parameter value indicating a link length of the first link in a case where the first link included in the plurality of routes is not the second link.

14. The non-transitory computer readable medium according to claim 13, wherein the disaster area includes at least a tsunami area representing a range reached by an influence of a tsunami, a landslide disaster area representing a range reached by an influence of a landslide disaster, and a liquefaction area representing a range reached by an influence of liquefaction caused by an earthquake, and the computing procedure computes, for each of the plurality of routes, the second parameter value indicating the link length of the first link, in a case where the first parameter value represents that the first link included in the plurality of routes at least partially overlaps the tsunami area or the landslide disaster area, or represents that the first link included in the plurality of routes at least partially overlaps the liquefaction area, and the first link is not the second link.

15. The non-transitory computer readable medium according to claim 7, wherein in a case where data indicating the predetermined road is not provided with a road width, the computer performs a data tailoring procedure providing a road width to the data, and the second determination procedure determines, among the links constituting the network, the second link which at least partially overlaps a road area representing a range of the road width provided by the data tailoring procedure.

* * * * *